United States Patent [19]

Venable

[11] Patent Number: 5,784,498
[45] Date of Patent: Jul. 21, 1998

[54] SYSTEM AND METHOD FOR SYNTHESIZING BACKGROUND TEXTURE IN AN IMAGE

[75] Inventor: Dennis L. Venable, Marion, N.Y.

[73] Assignee: Xerox Corporation, Stamford, Conn.

[21] Appl. No.: 585,030

[22] Filed: Jan. 11, 1996

[51] Int. Cl.$^6$ .............................. G06K 9/40; H04N 1/40
[52] U.S. Cl. ................... 382/254; 382/280; 358/448; 358/452
[58] Field of Search ..................... 382/254, 280, 382/282, 309; 358/448, 452, 453

[56] References Cited

U.S. PATENT DOCUMENTS 5,555,194   9/1996   Cok ........................................ 382/254

OTHER PUBLICATIONS

Restoration from Phase and Magnitude by Generalized Projections by Aharon Levi and Henry Stark pp. 277–319., from Image Recovery: Theory and Application.

*Primary Examiner*—Thomas D. Lee
*Attorney, Agent, or Firm*—Michael J. Nickerson

[57] ABSTRACT

A method backfills areas of an image with synthesized textures. This is realized by selecting a texture exemplar from an image and identifying an area of the image to be backfilled. An estimate of the synthesized texture is generated and predetermined spatial domain constraints are applied to the estimate. The spatially constrained estimate is operated upon by a Fourier transform to create a spectral function. Predetermined spectral domain constraints are applied to the spectral function and an an inverse Fourier transform is performed thereon to produce a synthesized texture. The synthesized texture is inserted into the area of the image to be backfilled if it is determined to be adequate. If the synthesized texture is inadequate, the synthesized texture is put through the synthesis process again until the the texture is adequate for backfilling.

21 Claims, 5 Drawing Sheets

SYSTEM AND METHOD FOR SYNTHESIZING BACKGROUND TEXTURE IN AN IMAGE

FIELD OF THE PRESENT INVENTION

The present invention is directed to a system or method for synthesizing background texture in an image. More specifically, the present invention is directed to a system or method which enables the replacement of unwanted objects or regions in an image with a synthesized background texture such that the edges bordering the deleted region are smooth.

BACKGROUND OF THE PRESENT INVENTION

In a production printing environment, the preparation of images for printing requires the removal of unwanted objects or regions in the image. For example, an image may contain a ball lying in a grassy yard wherein the ball is undesirable. Conventionally, to remove the unwanted object or region from the image, a region of the grassy yard without the ball would be electronically copied and pasted over the ball. This process is commonly known as cloning.

Although cloning provides a way of removing unwanted objects or regions from the image, this process tends to produce images which have border artifacts between the original background and the newly pasted over background. In other words, utilizing the conventional method of cloning to remove unwanted objects from an image, the resulting image may have artifacts which can facilitate the detection of the manipulation process as well as take away from the esthetics of the image. Therefore, it is desirable to provide a process which is capable of removing the unwanted objects while minimizing the border artifacts between the original background and the background image used to replace the unwanted objects.

SUMMARY OF THE PRESENT INVENTION

One aspect of the present invention is a method of backfilling areas of an image with synthesized textures. This method selects a texture exemplar from an image and identifies an area of the image to be backfilled. Thereafter, the method generates an initial estimate of the synthesized texture, applies predetermined spatial domain constraints to the initial estimate, performs a Fourier transformation on the spatially constrained estimate, applies predetermined spectral domain constraints on the transformed estimate, and performs an inverse Fourier transformation upon the spectrally constrained estimate to produce a synthesized texture. This synthesized texture is inserted into the area of the image to be backfilled.

Another aspect of the present invention is a method for generating a synthesized texture. This method selects a texture exemplar from an image and identifies an area of the image to be backfilled. Thereafter, the method generates an initial estimate of the synthesized texture, applies predetermined spatial domain constraints to the initial estimate, performs a Fourier transformation on the spatially constrained estimate, applies predetermined spectral domain constraints on the transformed estimate, and performs an inverse Fourier transformation upon the spectrally constrained estimate to produce a synthesized texture.

Further objects and advantages of the present invention will become apparent from the following description of the various features of the present invention.

BRIEF DESCRIPTION OF THE DRAWINGS

The following is a brief description of each drawing used in describing the present invention, and thus, the drawings are being presented for illustrative purposes only and should not be limitative of the scope of the present invention, wherein.

DETAILED DESCRIPTION OF THE PRESENT INVENTION

Figure 1:
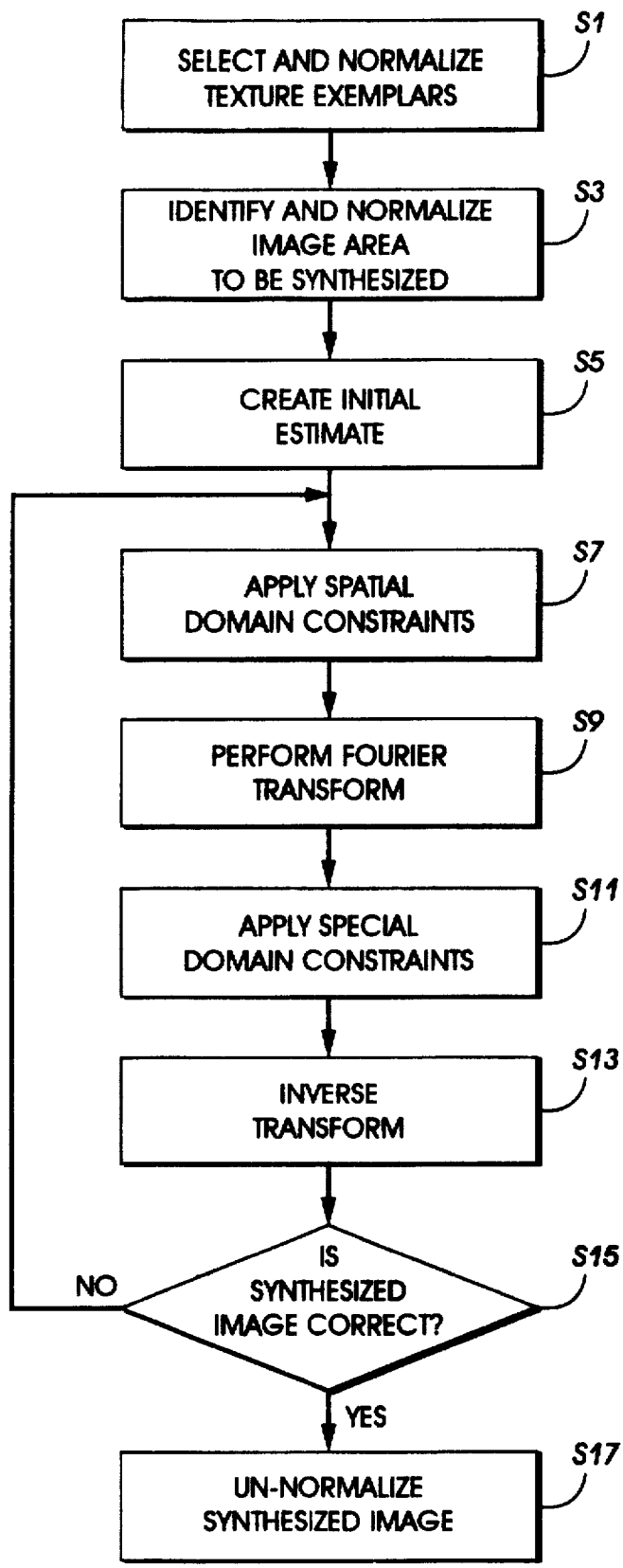
FIG. 1 is a flowchart illustrating the synthesizing process of the present invention.

For general understanding of the various features of the present invention, reference is made to the drawings. In the drawings, and in the description below, like reference numerals are used through to designate identical or equivalent elements or steps.

FIG. 1 illustrates a flowchart showing the texture synthesis process according to one embodiment of the present invention. As illustrated in FIG. 1, step S1 selects a texture exemplar. As noted above, the purpose of the present invention is to backfill areas of the image with synthesized textures that appear reasonable with respect to the surrounding areas. To meet this goal, the present invention interactively selects neighboring regions of the image which have textures similar to what is to be used as backfill. These selected regions are known as texture exemplars.

The selected exemplar region is normalized using any conventional normalization process. (The preferred normalization processes will be described below). Then, the average Fourier transfer modulus of the normalized exemplar, representing the probability density of spatial frequencies, is calculated and used as spectral domain constraints in a later performed operation which will be discussed in more detail below.

After completing step S1, the present invention proceeds to step S3 where the image area to be synthesized is identified. In other words, a region of the image containing the area to be synthesized is selected. This region includes pixels that are part of the background and pixels that are part of the area to be deleted. The background pixels of this region are used to apply the spatial domain constraints in a later described operation. The actual area within this region to be synthesized is identified by erasing the pixel associated with the area.

At step S5, an initial estimate of the synthesized area is created. In the preferred embodiment of the present invention, the entire selected synthesized area is normalized with the pixels associated with the actual area to be synthesized (the deleted area) being filled with zeros.

At step S7, the initial estimate created at step S5 has spatial domain constraints applied thereto. In the preferred embodiment of the present invention, the nontarget pixels of the selected image area are copied into the synthesized region so as to provide a constraint which retains the continuity of the known background pixels.

After the spatial domain constraints are applied to the identified area to be synthesized, the present invention performs a Fourier transformation at step S9 to yield a spectral function. Subsequently, spectral domain constraints are applied at step S11 to the spectral function. In the preferred embodiment of the present invention, the spectral domain constraints are applied by copying the average modulus of the exemplars as calculated in step S1 into the spectral function yielding a new function. The spectral domain constraints forces the synthesized area to maintain the spectral characteristics of the exemplar region, thereby retaining the correct texture.

Once the spectral domain constraints have been applied, the present invention performs an inverse Fourier transformation on the new function yielding a new estimate of the synthesized region. It is noted that the execution of steps S7, S9, S11, and S13 provide a process which reduces the artifacts at the border of the erased and background pixels.

At step S15, the new estimate of the synthesized region is analyzed to determine whether this estimate is adequate. If the estimate is adequate, step S17 de-normalizes the synthesized image and backfills the erased or deleted region with this synthesized texture. However, if step S15 determines that the new estimate of the synthesized region is not adequate, the present invention performs steps S7, S9, S11, and S13 again to generate a new synthesized region. Thus, the present invention provides an iterative process to generate or create synthesized texture for an image. In the subsequent iterations of steps S7, S9, S11, and S13, the new synthesized texture generated at step S13 is utilized as the estimate when restarting the iterative process at step S7.

Figure 2:
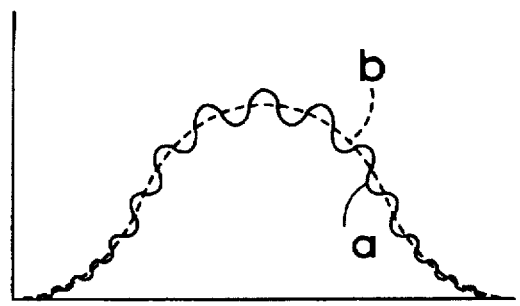
FIG. 2 is a graphical representation illustrating non-normalized image data.

FIG. 2 illustrates a graphical representation of non-normalized image data A. To normalize this image data A, a normalization process is used to remove large scale intensity variations within local areas of the image while retaining the texture, or fine scale intensity variations, by reducing local areas to a zero mean intensity. One such normalization process is referred to as surface normalization which is utilized in the preferred embodiment of the present invention.

With respect to surface normalization, the normalization process attempts to fit a surface to the image intensity using a least squares fit to a two-dimensional polynomial. Moreover, the polynomial can be as high an order as necessary. For example, the polynomial may be $P(x,y)=c_0+ c_1x+c_2y+c_3xy+c_3x^2+c_5y^2+c_6x^2y^2$.

Figure 3:
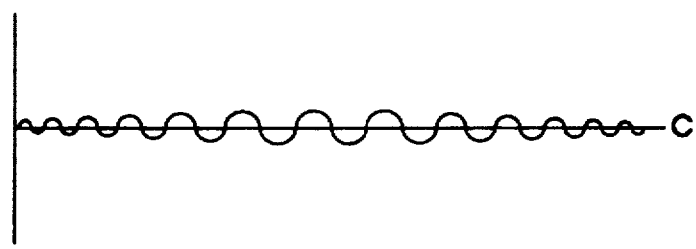
FIG. 3 is a graphical representation illustrating normalized image data.

Once the coefficients have been evaluated using least squares, an image pixel is normalized by subtracting the value of the polynomial at this point. Each pixel is processed accordingly to generate a region of normalized data. A representation of this process is illustrated in FIG. 2 wherein A represents the image intensity and B represents the polynomial used to fit a surface to the image intensity. The result of this normalization is illustrated as curve C in FIG. 3. As illustrated in FIG. 3, surface normalization allows the removal of a fairly complicated intensity gradient from local area regions yielding a zero means intensity image.

Other types of normalization processes can also be utilized in connection with the present invention. For example, a zero mean normalization process wherein all the pixel values of an image are added and the average value is obtained. In this normalization process, the average value is then subtracted from the image intensity of each pixel resulting in an image with a zero mean value.

A third normalization process which is applicable to the present invention is a Z normalization process. In this normalization process, all the pixel values of an image are added and the average value is obtained. The average value is then subtracted from the image and the resultant from this subtraction is then divided by a standard deviation. Again, this results in an image with a zero mean value.

Thus, any normalization process can be utilized with the present invention so long as the normalization process is capable of removing large scale intensity variations within local areas of the image while retaining the texture, or fine scale intensity variations and while reducing local areas to a zero mean intensity. The noramlization process may include any of the processes described above or a combination thereof in a cascading arrangement.

As generally described above with respect to FIG. 1, the synthesis process of the present invention is based on restoration by generalized projections; specifically, restoration from magnitude (RFM). Given an image containing a small region $\Re$ to be replaced with a synthesized texture matching the surrounding texture, the process defines a rectangular subset of the image $\Im$ large enough to fully enclose region $\Re$ and also include a significant number of pixels of background texture. Next, the process defines $\bar{\Re}$ to be the region of $\Im$ not including $\Re$ and defines one or more rectangular regions $E_i$ of the same size as $\Im$ which contain only texture patterns similar to the pattern to be synthesized. The regions $E_i$ are known as exemplar regions.

The process then calculates $M(\omega)$ which is the average modulus of the Fourier transform of an exemplar region $E_i$. $M(\omega)$ represents the probability density of spatial frequencies in the desired background texture. Furthermore, to facilitate this discussion, let $\Im (x,y)$ define the image intensity pattern of region $\Im$; similarly for $\Re(x,y)$ and $\bar{\Re}(x,y)$, and let $g_k(x,y)$ be the $k^{th}$ estimate of $\Im(x,y)$ including the synthesized texture over $\Re$.

The synthesis process applies spatial and spectral constraints iteratively on the image data of region $\Im$ until a result of acceptable quality is achieved. Acceptable quality, in the preferred embodiment of the present invention, is determined by the operator.

The spatial constraint is used to retain known background pixels, i.e., pixels that are elements of $\bar{\Re}$ retain their original value, whereas the spectral constraint is used to force the modulus of the synthesis to be $M(\omega)$, the average modulus of the exemplar region. The application of these constraints is defined by projection operations onto sets of functions.

The two sets of functions involved in the synthesis of the present invention are: the set of functions $\xi_1$ limited in space to region $\Re$ with pixel values given by $\bar{\Re}(x,y)$ over region $\bar{\Re}$ and the set of all functions $\xi_2$ which have a Fourier transform magnitude equal to the average exemplar modulus $M(\omega)$. Thus, $\xi_2 = \{g(x): g(x) = \Re(x) \text{ for } x \in \Re\}$, $\xi_2 = \{g(x) \leftrightarrow G(\omega): |G(\omega)| = M(\omega) \text{ for all } \omega\}$, where $g(x)$ is the pixel intensity (written one dimensionally for simplicity) and $G(\omega)$ is the Fourier transform of $g(x)$.

The projections $P_1$ onto $\xi_1$ and $P_2$ onto $\xi_2$ are given by $$P_{1g} = \left\{ \begin{array}{ll} g(x), & x \in \Re \\ \Re(x) & \text{otherwise} \end{array} \right\},$$

$$P_{2g} \leftrightarrow M(\omega) e^{i\phi(\omega)},$$

where $\phi(\omega)$ is the phase of $G(\omega)$.

This process defines the iterations as $gn_{n+1} = T_1 T_2 g_n$ with $T_i = 1 + \lambda_i (P_i - 1)$, $i=1,2$. However, the relaxation parameters can be set to $\lambda_1 = \lambda_2 = 1$, thus reducing the iterations to $gn_{n+1} = P_2 P_1 g_n$. Additionally, the iteration equation is commuted to $gn_{n+1} = P_2 P_1 g_n$, such that spatial constraints are applied first, followed by spectral constraints. Pixels in region $\Re$ and near $\Re$ in the final synthesized region may not be identical to the original pixel values, but the continuity across the edge of the synthesized region will be improved.

The iterative process as described with respect to FIG. 1 can be summarized as follows for the $k^{th}$ iteration:

1) Apply spatial domain constraints $$g'_k(x, y) = \left\{ \begin{array}{ll} g_k(x, y)(x, y) \in \Re \\ \Re(x, y) & \text{otherwise.} \end{array} \right\},$$

2) Fourier transform $g'k(x,y)$ $G(u,v) = FT\{g'_k(x,y)\}$,

3) Apply spectral domain constraints $\phi(u,v) = $ phase of $G(u,v)$, $G'_k(u,v) = M(u,v) \, e^{i\phi(u,v)}$.

4) Inverse Fourier transform $g_{k+1}(x,y) = FT^{-1}\{G'_k(uv)\}$.

As noted above, appropriate normalization of the image data can significantly improve the quality of the synthesis and reduce the required number of iterations. Normalization is used to remove large scale intensity gradients within local areas of the image, while texture, or fine scale variations, are retained. Normalization is applied to the image region $\Re$ prior to beginning the synthesis iterations, and also to all exemplars $E_i$ prior to evaluation of the average modulus $M(\omega)$. Therefore, the average modulus will be more representative of the texture and be less effected by low spatial frequency terms.

In the preferred embodiment of the present invention, normalization is realized by the local image area intensity gradient being fitted to an $N^{th}$ order two-dimensional polynomial. The fitted distribution is then subtracted pixel-by-pixel from the image area $\Re$ to create the normalized image area. The synthesis iterations of the present invention are applied to the normalized image area. The fitted distribution is added to the result of the synthesis iterations to create the final synthesized image area.

A typical polynomial for the normalization is given by:

$$p(x,y) = c_0 + c_1 x + c_2 y + c_3 xy + c_4 x^2 + c_5 y^2 + c_6 x^2 y^2$$

Clearly, polynomials of any order are possible. The coefficients of the polynomial fit are determined by:

$T = F \, M^t (MM^t)^{-1}$, where $T = [c_0 \, c_1 \ldots ]$, $F = [I(x_0, y_0) \, I(x_1, y_1) \ldots ]$, and $I(x_0, y_0)$ is the intensity value of image area at location $(x_0, y_0)$.

$$M^t = \begin{bmatrix} 1 & x_0 & y_0 & x_0 y_0 & x_0^2 & y_0^2 & x_0^2 y_0^2 \\ 1 & x_1 & y_1 & x_1 y_1 & x_1^2 & y_1^2 & x_1^2 y_1^2 \\ \ldots & \ldots & \ldots & \ldots & \ldots & \ldots & \ldots \end{bmatrix}$$

To facilitate a better understanding of the present invention, the following description will describe how the present invention provides a synthesized texture for backfilling.

A rectangular region $\Im$ containing the area to be synthesized is selected. $\Im$ must include pixels that are part of the background $\Re$ and pixels of the area to be synthesized $\Re$. The background pixels $\Re$ will be used to apply the spatial domain constraint. In a preferred embodiment, the area $\Re$ is selected by sweeping a rectangle with a mouse, and the area $\Re$ is identified by erasing pixels using a mouse.

As noted above, the purpose of the present invention is to synthesize areas of the image with textures appearing reasonable with respect to surrounding areas. To define reasonable, exemplar regions $E_i$ which have texture similar to that to be backfilled are selected. For the case of removing a ball from a grassy yard, exemplars might be nearby grassy regions. Exemplars are normalized using one of the normalization processes described above. The average Fourier transform modulus of the normalized exemplars is calculated and used as the spectral domain constraint in the iterative synthesis process. At least one exemplar is required. In a preferred embodiment, exemplars $E_i$ are selected by sweeping a rectangle with a mouse. The dimensions of $E_i$ may be restricted to those of $\Im$ for computational simplicity.

The synthesis iteration process requires an initial estimate $g_0(x,y)$ of the synthesized area to begin the iterations. Since normalization results in a zero-mean intensity, $g_0(x,y)$ is filled with zeros. Thereafter, spatial domain constraints are applied to estimate $g_k(x,y)$, yielding $g'_k(x,y)$. This is the first of four iterated steps. For each iteration, pixels values $\Re(x,y)$ from region are $\Re$ copied into the synthesized region. This constraint retains continuity of the known background pixels.

A Fourier transform of $g'_k(x,y)$ is then performed to yield the spectral function $G_k(u,v)$, and spectral domain constraints, are applied thereto by copying the precalculated average modulus of the exemplars $M(\omega)$ into $G_k(u,v)$, yielding $G'_k(u,v)$. This constraint forces the synthesized area to maintain the special characteristics of the selected exemplar regions, thus retaining the correct texture. Subsequently, an inverse Fourier transform is performed on $G'_k(u,v)$, yielding the next estimate of the synthesized area $g'_{k+1}(x,y)$.

If the quality of the synthesized region is adequate, the final synthesized region $\Im'$ in added to the normalization polynomial pixel-by-pixel to the estimate $g_{k+1}(x,y)$. If the synthesized region is inadequate, the process is repeated with the inadequate region being used as the initial estimate to which the spatial domain constraints are applied.

An example of synthesizing texture for backfilling in the image region, utilizing FIGS. 4–11, will be explained below.

Figure 4:
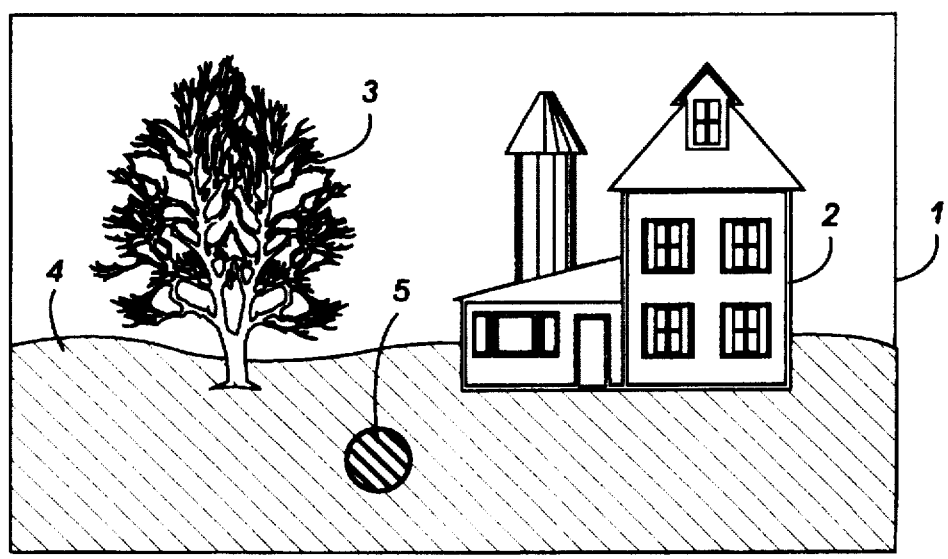
FIG. 4 illustrates an image to be backfilled according to the concepts of the present invention.

As noted above, the preparation of images for printing may often require the removal of unwanted objects or regions in the image. In the example explained below, as illustrated in FIG. 4, the present invention will be utilized to process an image 1 of a house 2 being prepared for inclusion into a real estate catalog. As illustrated in FIG. 4, the image includes a ball 5 lying in the front yard of a grassy area 4 with a tree 3 nearby. In this example, it is desirable to remove the ball 5 from the front yard and backfill the region occupied by the ball 5 with the appropriate grassy texture.

Figure 9:
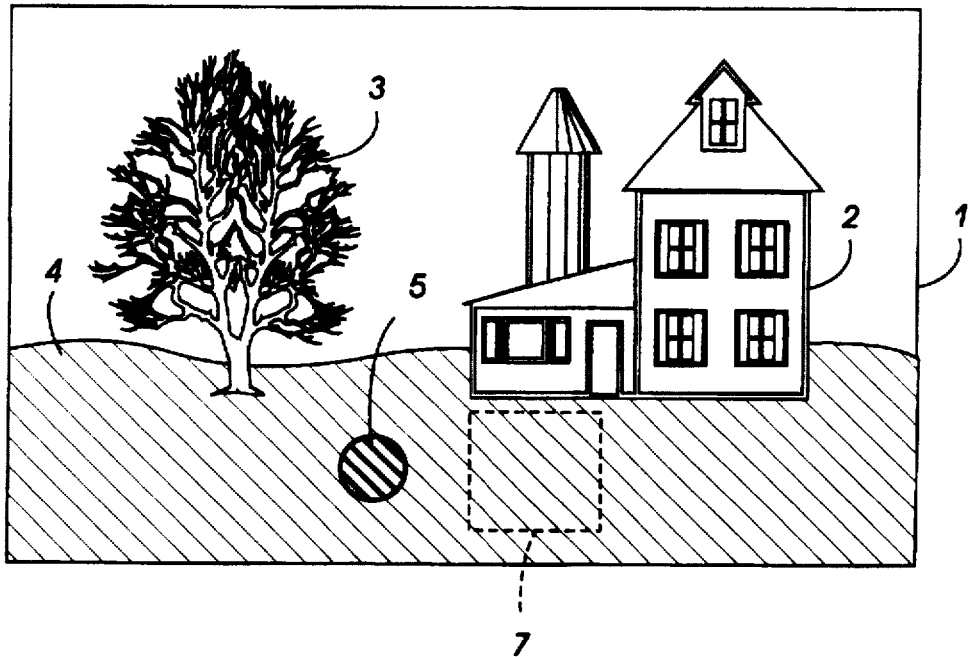
FIG. 9 illustrates a display window showing an image with a selected texture exemplar.

As discussed above, the present invention initially selects a texture exemplar which will be utilized in synthesizing the backfill image. An example of selecting the texture exemplar is illustrated in FIG. 9. As shown in FIG. 9, a region 7 is selected as the texture exemplar. (The actual texture exemplar 13 is illustrated in more detail in FIG. 10.) The selected texture exemplar 7 includes grassy texture 4 which is what is to be backfilled into the region being presently occupied by the ball 5.

Figure 10:
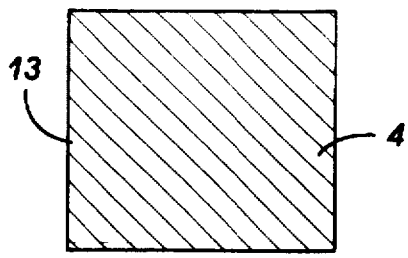
FIG. 10 illustrates a display window showing the selected texture exemplar of FIG. 9.

In the preferred embodiment of the present invention, the exemplar 7 is chosen by dragging a rectangle, made by a cursor, over the image to a desired location. Once the rectangle has been established, the user can select the exemplar by either activating a graphic user interface button or hitting a specified key on a keyboard. In the preferred embodiment of the present invention, the chosen exemplar is displayed in an exemplar window, as illustrated in FIG. 10, and its modulus is displayed in a separate modulus window.

Figure 5:
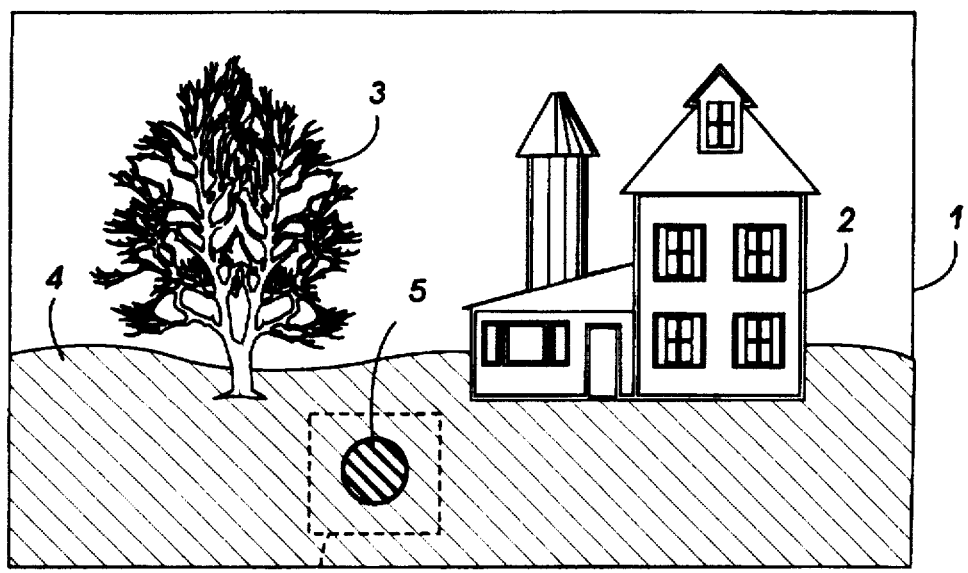
FIG. 5 illustrates a display window showing an image with an area to be removed.

Once the texture exemplar has been selected, the region of the image containing the area to be synthesized is selected. This selection process is illustrated in FIG. 5. More specifically, FIG. 5 shows the selection region 6 which includes pixels that are part of the background and pixels that are part of the area to be deleted 5.

In the preferred embodiment of the present invention, the selection is identified by dragging a rectangle over the image to a desired location. Once the rectangle 6 has been established at the desired location, the user can implement the selection by either activating a graphic user interface button on screen or activating a predetermined key on a keyboard.

Figure 6:
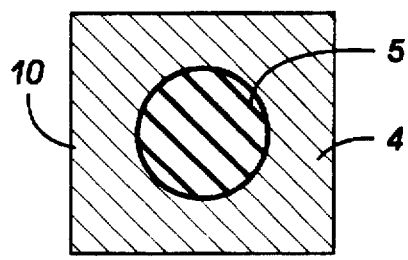
FIG. 6 illustrates a display window showing an area having the to be removed area in FIG. 5.

In the preferred embodiment of the present invention, the selected area will be displayed in a selection window as illustrated in FIG. 6. More specifically, FIG. 6 illustrates the selected area as having the object to be removed 5 and the background area 4 (grassy yard).

Figure 7:
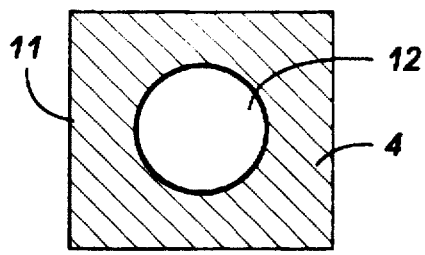
FIG. 7 illustrates a display window showing the removal of the object within the area illustrated in FIG. 6.
Figure 8:
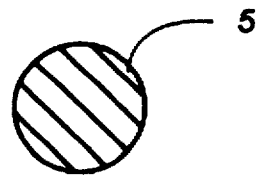
FIG. 8 illustrates the object removed from FIG. 7.

Once the selection is placed in the selection window, the pixels associated with the target area or the object to be deleted 12 are erased, as illustrated in FIG. 7. In a preferred embodiment of the present invention, the erasing of the target pixel areas are identified by click and dragging a cursor, using a mouse, in the selection window so as to erase the target pixel. FIG. 8 illustrates the actual object 5 which had been erased from the selection window as illustrated in FIG. 7.

As discussed above, the present invention then creates an initial estimate to be used in beginning of the synthesis process. In the preferred embodiment of the present invention, the estimate is displayed in the synthesis window (after appropriate de-normalization). The initial estimate is then processed by applying spatial domain constraints to the estimate, performing a Fourier transform upon the spatially constrained estimate, applying spectral domain constraints upon the spectral function generated by the Fourier transform, and performing an inverse Fourier transform upon the spectrally constrained function.

As noted above, the results of the inverse Fourier transform provide the next estimate of the synthesized area. In the preferred embodiment of the present invention, the de-normalized next estimate is displayed in the synthesis window so that the user can fully evaluate the synthesized area to be used as the backfill.

If the user believes that the new synthesized region is inadequate, in the preferred embodiment of the present invention, the user selects a reiterate graphic user interface button or a predetermined key on the keyboard which causes the synthesis process to be repeated N times before the estimate is redisplayed for the user's examination with the new Nth time synthesized region being substituted for the initial estimated synthesized region, N being a whole number equal to or greater than 1.

Figure 11:
FIG. 11 illustrates a processed image containing synthesized background texture generated according to the concepts of the present invention.

On the other hand, if the user believes that the synthesized region is adequate, the user may select an implementation graphic user interface button which causes the synthesized selection to be permanently saved in the original image as illustrated in FIG. 11.

The present invention, although described as a method, can be readily implemented on a general purpose computer, a personal computer, or a dedicated or specialized digital image processing device. In the preferred embodiment of the present invention, the synthesis process is carried out on a personal computer which may be connected to a scanner, network, file server, and/or printer.

In recapitulation, the present invention synthesizes textural regions by applying spatial domain constraints to an estimate of the synthesized region, performing a Fourier transform upon the spatially constrained estimate, applying spectral domain constraints upon the spectral function, and performing an inverse Fourier transform upon the spectrally constrained values to yield a synthesized region which can be utilized as backfill in an image in which an object has been deleted.

Moreover, this process can be iterative in both the spatial and spectral domains until the quality of the synthesized region is acceptable. By utilizing this synthesis process, the present invention is capable of backfilling an area corresponding to a deleted object with new synthesized texture while minimizing border artifacts between the original background and the synthesized image.

While the invention has been described with reference to various embodiments disclosed above, it is not confined to the details set forth above, but is intended to cover such modifications or changes as may come within the scope of the attached claims.

What is claimed is:

1. A method of backfilling areas of an image with synthesized textures, comprising the steps of:

(a) selecting a texture exemplar from an image;
   (b) identifying an area of the image to be backfilled;
   (c) generating an estimated synthesized texture;
   (d) applying predetermined spatial domain constraints to the estimated synthesized texture;
   (e) performing a Fourier transform on the spatially constrained estimated synthesized texture;
   (f) applying predetermined spectral domain constraints on the transformed estimated synthesized texture;
   (g) performing an inverse Fourier transform upon the spectrally constrained estimated synthesized texture to produce a synthesized texture;
   (h) determining if the synthesized texture is adequate; and
   (i) inserting the synthesized texture into the area of the image to be backfilled when it is determined that the synthesized texture is adequate.

2. The method as claimed in claim 1, wherein said step (c) comprises the substeps of:

(c1) filling the area of the image to be backfilled with zeros, and (c2) generating an estimate of normalized image data representing the estimated synthesized texture; and said step (g) including the substep of (g1) de-normalizing the inverse Fourier transformed estimated synthesized texture to produce the synthesized texture.

3. The method as claimed in claim 2, wherein said substep (c2) normalizes the estimated synthesized texture by calculating a zero mean average of the pixel values in the estimate.

4. The method as claimed in claim 2, wherein said substep (c2) normalizes the estimated synthesized texture by calculating a mean average of the pixel values in the estimate.

5. The method as claimed in claim 4, wherein said substep (c2) further divides the mean averaged data by a determined standard deviation.

6. The method as claimed in claim 2, wherein said substep (c2) normalizes the estimated synthesized texture by fitting a surface to the pixel values in the estimate to generate a polynomial representing the surfaced subtracting values generated by the polynomial representing the surface from the pixel values.

7. The method as claimed in claim 1, further comprising the step of:

(j) repeating steps (d)–(g) upon the results generated in step (g) when it is determined that the synthesized texture is inadequate.

8. The method as claimed in claim 1, wherein said step (b) comprises the substeps of:

(b1) selecting a region of the image containing the area to be backfilled, the region including pixels of the area to be deleted and pixels that are part of a background around the area to be deleted; and (b2) erasing the pixels of the area to be deleted.

9. The method as claimed in claim 1, wherein said step (a) comprises the substeps of:

(a1) normalizing the selected texture exemplar;

(a2) calculating an average Fourier transform modulus of the normalized exemplar; and (a3) using the average Fourier transform modulus as the predetermined spectral domain constraints in said step (f).

10. The method as claimed in claim 9, wherein said substep (c2) normalizes the estimated synthesized texture by calculating a zero mean average of the pixel values in the estimate.

11. The method as claimed in claim 9, wherein said substep (c2) normalizes the estimated synthesized texture by calculating a mean average of the pixel values in the estimate.

12. The method as claimed in claim 9 wherein said substep (c2) normalizes the estimated synthesized texture by fitting a surface to the pixel values in the estimate to generate a polynomial representing the surfaced subtracting values generated by the polynomial representing the surface from the pixel values.

13. The method as claimed in claim 9, wherein said substep (c2) further divides the mean averaged data by a determined standard deviation.

14. The method as claimed in claim 1, wherein said step (a) comprises the substeps of:

(a1) normalizing the selected texture exemplar, (a2) calculating an average Fourier transform modulus of the normalized exemplar, and (a3) using the average Fourier transform modulus as the predetermined spectral domain constraints in said step (f);

said step (b) including the substeps of, (b1) selecting a region of the image containing the area to be backfilled, the region including pixels of the area to be deleted and pixels that are part of a background around the area to be deleted, and (b2) erasing the pixels of the area to be deleted;

said step (c) including the substeps of, (c1) filling the area of the image to be backfilled with zeros, and (c2) generating an estimate of normalized image data representing the estimated synthesized texture; and said step (g) including the substeps of (g1) denormalizing the inverse Fourier transformed estimated synthesized texture to produce the synthesized texture.

15. The method as claimed in claim 14, further comprising the step of:

(j) repeating steps (d)–(g) upon the results generated in step (g) when it is determined that the synthesized texture is inadequate.

16. The method as claimed in claim 1, wherein said step (b) comprises the substeps of:

(b1) selecting a region of the image containing the area to be backfilled, the region including pixels representing the area to be deleted and pixels representing a background around the area to be deleted;

(b2) erasing the pixels of the area to be deleted;

(b3) normalizing pixel values of the pixels representing the background; and (b4) using the normalized pixel values of said substep (b3) as the predetermined spatial domain constraints in said step (d).

17. A method for generating a synthesized texture comprising the steps of:

(a) selecting a texture exemplar from an image;

(b) identifying an area of the image to be backfilled;

(c) generating an estimated synthesized texture;

(d) applying predetermined spatial domain constraints to the estimated synthesized texture;

(e) performing a Fourier transform on the spatially constrained estimated synthesized texture;

(f) applying predetermined spectral domain constraints on the transformed estimated synthesized texture; and (g) performing inverse Fourier transform upon the spectrally constrained estimated synthesized texture to produce a synthesized texture.

18. The method as claimed in claim 17, further comprising the steps of:

(h) determining if the inverse Fourier transformed estimated synthesized texture is an adequate backfill; and (i) repeating steps (d)–(g) upon the results generated in step (g) when said step (h) determines that the estimated synthesized texture is inadequate.

19. The method as claimed in claim 17, wherein said step (b) comprises the substeps of:

(b1) selecting a region of the image containing the area to be backfilled, the region including pixels of the area to be deleted and pixels that are part of a background around the area to be deleted; and (b2) erasing the pixels of the area to be deleted.

20. The method as claimed in claim 17, wherein said step (a) comprises the substeps of:

(a1) normalizing the selected texture exemplar;

(a2) calculating an average Fourier transform modulus of the normalized exemplar; and (a3) using the average Fourier transform modulus as the predetermined spectral domain constraints in said step (f).

21. The method as claimed in claim 17, wherein said step (b) comprises the substeps of:

(b1) selecting a region of the image containing the area to be backfilled, the region including pixels representing the area to be deleted and pixels representing a background around the area to be deleted;

(b2) erasing the pixels of the area to be deleted;

(b3) normalizing pixel values of the pixels representing the background; and (b4) using the normalized pixel values of said substep (b3) as the predetermined spatial domain constraints in said step (d).

* * * * *